United States Patent
Yen et al.

(10) Patent No.: US 10,300,902 B2
(45) Date of Patent: May 28, 2019

(54) METHOD AND APPARATUS FOR MONITORING A VEHICLE BRAKING SYSTEM

(71) Applicant: GM GLOBAL TECHNOLOGY OPERATIONS LLC, Detroit, MI (US)

(72) Inventors: Chih-hung Yen, Bloomfield Hills, MI (US); Xiaoyu Huang, Troy, MI (US); Richard A. Kaatz, Milford, MI (US); Robert L. Nisonger, Milford, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 56 days.

(21) Appl. No.: 15/629,178

(22) Filed: Jun. 21, 2017

(65) Prior Publication Data

US 2018/0370519 A1    Dec. 27, 2018

(51) Int. Cl.
| | |
|---|---|
| *B60T 17/22* | (2006.01) |
| *G07C 5/00* | (2006.01) |
| *G05B 23/02* | (2006.01) |
| *B60W 50/04* | (2006.01) |
| *B60W 50/00* | (2006.01) |

(52) U.S. Cl.
CPC ............ *B60T 17/221* (2013.01); *B60T 17/22* (2013.01); *B60W 50/04* (2013.01); *G05B 23/0267* (2013.01); *G05B 23/0272* (2013.01); *G07C 5/006* (2013.01); *B60T 17/225* (2013.01); *B60T 2270/406* (2013.01); *B60W 2050/0077* (2013.01); *B60W 2050/0089* (2013.01); *B60W 2050/041* (2013.01); *B60W 2050/046* (2013.01)

(58) Field of Classification Search
CPC .. B60T 17/221; B60T 17/22; B60T 2270/406; B60T 17/225; G05B 23/0267; G05B 23/0272; B60W 50/14; B60W 2050/0089; B60W 2050/041; B60W 2050/046; B60W 2050/0077; G07C 5/006
See application file for complete search history.

(56) References Cited

U.S. PATENT DOCUMENTS

| | | | | |
|---|---|---|---|---|
| 5,892,437 | A * | 4/1999 | Scheibe et al. | ....... B60T 17/221 701/70 |
| 6,891,468 | B2 * | 5/2005 | Koenigsberg et al. | ...................... B60T 17/22 701/70 |
| 6,957,870 | B2 * | 10/2005 | Kagawa et al. | ........ B60T 8/367 303/113.4 |

(Continued)

*Primary Examiner* — Dale W Hilgendorf
(74) *Attorney, Agent, or Firm* — Quinn IP Law

(57) ABSTRACT

A vehicle braking system including a brake pedal in communication with a wheel brake, a brake actuation system, a braking system controller, an on-board driver communication system, and a controller is described. Parameters associated with a braking request, a brake actuation command and vehicle operation are monitored during each braking event, and segmented the into parameters associated with a static portion of the braking event and parameters associated with a dynamic portion of each braking event, evaluate the parameters associated with the static portion of the braking event and evaluate the parameters associated with the dynamic portion of the braking event, and assess a state of health of the braking system based upon the evaluation of the parameters. The assessment of the state of health of the braking system is communicated to a vehicle driver via the on-board driver communication system.

20 Claims, 8 Drawing Sheets

(56) References Cited

U.S. PATENT DOCUMENTS

| | | | |
|---|---|---|---|
| 7,191,642 B2* | 3/2007 | Paulsen et al. ......... | B60T 17/22 73/121 |
| 8,215,725 B2* | 7/2012 | Jackson et al. ....... | B60T 17/221 303/124 |
| 8,891,468 B2* | 11/2014 | Jung ...................... | B60T 17/22 701/70 |
| 2014/0074345 A1* | 3/2014 | Gabay et al. .......... | G07C 5/008 701/31.4 |

* cited by examiner

METHOD AND APPARATUS FOR MONITORING A VEHICLE BRAKING SYSTEM

INTRODUCTION

Vehicle braking systems may benefit from monitoring.

SUMMARY

A vehicle braking system is described and includes a brake pedal in communication with a wheel brake, a brake actuation system, a braking system controller, an on-board driver communication system, and a controller that is operatively connected to the braking system controller and in communication with the brake pedal and the brake actuation system. The controller includes an instruction set that is executable to monitor the brake pedal to determine a braking request, monitor the brake actuation system to determine a brake actuation command, and monitor vehicle operation. The instruction set is executable to determine parameters associated with the braking request, the brake actuation command and the vehicle operation during each braking event, segment the parameters associated with the braking request, the brake actuation command and the vehicle operation into parameters associated with a static portion of the braking event and parameters associated with a dynamic portion of each braking event, evaluate the parameters associated with the static portion of the braking event and evaluate the parameters associated with the dynamic portion of the braking event, and assess a state of health of the braking system based upon the evaluation of the parameters. The assessment of the state of health of the braking system is communicated to a vehicle driver via the on-board driver communication system.

An aspect of the disclosure includes communicating the parameters associated with the static portion of the braking event and the parameters associated with the dynamic portion of the braking event to an off-board controller; wherein the off-board controller is disposed to evaluate the parameters, assess the state of health of the braking system based upon the evaluation, and communicate the assessment of the state of health of the braking system to the vehicle.

Another aspect of the disclosure includes storing, in a memory device in communication with the on-vehicle controller, the parameters associated with the braking request, the brake actuation command and the vehicle operation during the static portion of the braking event during each braking event.

Another aspect of the disclosure includes detecting occurrence of a fluidic leak in the vehicle braking system based upon the parameters associated with the braking request, the brake actuation command and the vehicle operation during the static portion of a plurality of the braking events.

Another aspect of the disclosure includes storing, in a memory device in communication with the on-vehicle controller, the parameters associated with the braking request, the brake actuation command and the vehicle operation during the dynamic portion of the braking event during each braking event.

Another aspect of the disclosure includes detecting presence of incorporated air in the vehicle braking system based upon the parameters associated with the braking request, the brake actuation command and the vehicle operation during the dynamic portion of a plurality of the braking events.

Another aspect of the disclosure includes monitoring the braking request by monitoring a driver braking request.

Another aspect of the disclosure includes monitoring the braking request by monitoring an autonomic braking command.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as "left", "right", "rear" and "front" may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
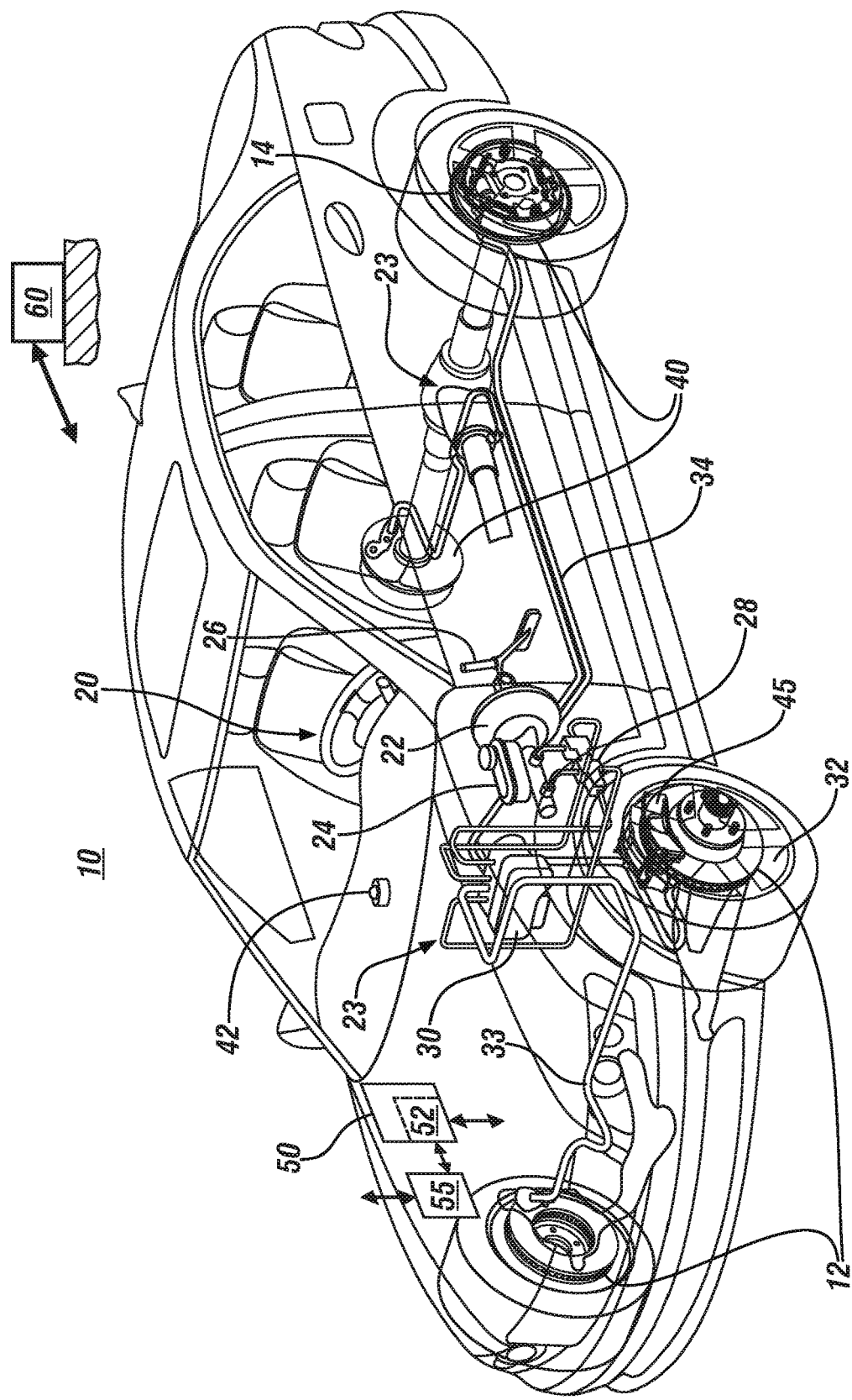
FIG. 1 schematically shows a vehicle braking system, in accordance with the disclosure.

Referring to the drawings, wherein like reference numerals correspond to like or similar components throughout the several Figures, FIG. 1, consistent with embodiments disclosed herein, schematically illustrates a braking system 20 for a vehicle 10. The vehicle 10 may include, but not be limited to a mobile platform in the form of a commercial vehicle, industrial vehicle, agricultural vehicle, passenger vehicle, aircraft, train, all-terrain vehicle, personal movement apparatus, robot and the like to accomplish the purposes of this disclosure. The vehicle 10 is configured as a four-wheel passenger vehicle as shown, although the concepts described herein are not so limited. The vehicle includes front wheels 12 and rear wheels 14, wherein each of the front and rear wheels 12, 14 includes a corner module that includes a corresponding front and rear brake actuator 45, 40, respectively. As shown, and in a non-limiting embodiment, the front brake actuators 45 for the corner modules associated with each of the front wheels 12 is a disc brake and the rear brake actuators 40 for the corner modules associated with each of the rear wheels 14 is a drum brake. Wheel speed sensors 32 are disposed as parts of the corner modules to monitor rotational speeds of each of the front and rear wheels 12, 14.

Overall, the braking system 20 is composed of elements that are operative to effect vehicle braking via the front and rear brake actuators 45, 40 in response to a braking command. As described herein, the braking command can originate from driver input to a brake pedal 26 or some form of an autonomous vehicle control system that can include a driver assistance controller 50. A braking actuation system 23 includes various components that translate the braking command to the front and rear brake actuators 45, 40. A braking system controller 30 is disposed to monitor and control operation of the braking system 20.

The braking system 20 in one embodiment can be configured as a fluidic circuit that includes the brake pedal 26, braking actuation system 23, the braking system controller 30, and the front and rear brake actuators 45, 40 that are disposed at the corner modules of the front and rear wheels 12, 14. The braking actuation system 23 includes a brake booster 22, a master cylinder 24, a proportioning valve 28, front brake lines 33 and rear brake lines 34. The front brake lines 33 are fluidly connected to the front brake actuators 45 associated with each of the corner modules for the front wheels 12 and the rear brake lines 34 are fluidly connected to the rear brake actuators 40 associated with each of the corner modules for the rear wheels 14. The braking system controller 30 can include an ABS (anti-lock braking system), a brake fluidic pump and a hydraulic pressure sensor that is disposed to monitor hydraulic pressure. The brake pedal 26 generates the driver braking request 27, which can be in the form of a hydraulic pressure signal, a pedal position electronic signal, or another metric that indicates a driver request for braking. The driver braking request 27 is in the form of a driver braking request that is input by a driver to the brake pedal 26 in one embodiment. The driver braking request 27 can be supplanted by or supplementally adapted to include the autonomic braking command 51 originating from the driver assistance controller 50, wherein the autonomic braking command 51 may be separate from the driver braking request 27 that is input via the brake pedal 26. The braking actuation system 23 is a closed fluidic system that is filled with a brake fluid. The braking system 20 operates, overall, by generating fluidic pressure in the brake fluid contained in the braking actuation system 23 in response to the driver braking request 27 and/or the autonomic braking command 51, wherein the fluidic pressure is employed to urge the front and rear brake actuators 45, 40 to effect vehicle braking in response to a driver braking request 27 or an autonomic braking command 51 in this embodiment. Alternatively, the braking system 20 and braking actuation system 23 can be configured as an electric brake system ("E-brake"), in which the hydraulic circuit is supplanted by electric components including, e.g., a solenoid actuator or another suitable brake actuator that is attached to the brake pedal 26 and front and rear brake actuators 45, 40 that are solenoid-actuated.

Monitored parameters on-vehicle can include, by way of non-limiting examples, brake pedal position, input rod position or piston position for E-brake, brake pedal position rate, main brake pressure, commanded brake pressure (for E-brake), a vehicle longitudinal acceleration/deceleration signal, a commanded vehicle deceleration (for E-brake), wheel speeds, wheel decelerations, vacuum pressure sensor reading (not existing in E-brake), ABS-active, traction control-active and electronic spark control-active signals, vehicle speed, steering angle, yaw rate, lateral acceleration, axle torque from propulsion system, and/or regenerative brake torques (for E-brake).

The braking system controller 30 is in communication with an on-board driver communication system 42, which can be in the form of a dashboard lamp or another device that visually, audibly or haptically communicates with the vehicle driver.

In one embodiment, a driver assistance controller 50 including an autonomic brake control routine 52 is employed. In one embodiment, the driver assistance controller 50 is an integrated element of an advanced driver assistance system, such as may include an adaptive cruise control system, a pre-collision warning system, a collision avoidance system, etc. In one embodiment, the driver assistance controller 50 can be an integrated portion of an autonomous vehicle control system. Regardless of the implementation details of the advanced driver assistance system, the autonomic brake control routine 52 is configured to generate an autonomic braking command 51 that may be separate from the driver braking request 27 that is input via the brake pedal 26. The autonomic brake control routine 52 is configured to generate the autonomic braking command 51, which can be communicated to the braking system controller 50. In one embodiment, the driver assistance controller 50 and the braking system controller 30 are in communication with a communication controller 55, which can be configured to wirelessly communicate with an off-board communication system 60. The off-board communication system 60 can be a remotely located vehicle monitoring center, or a vehicle service center.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
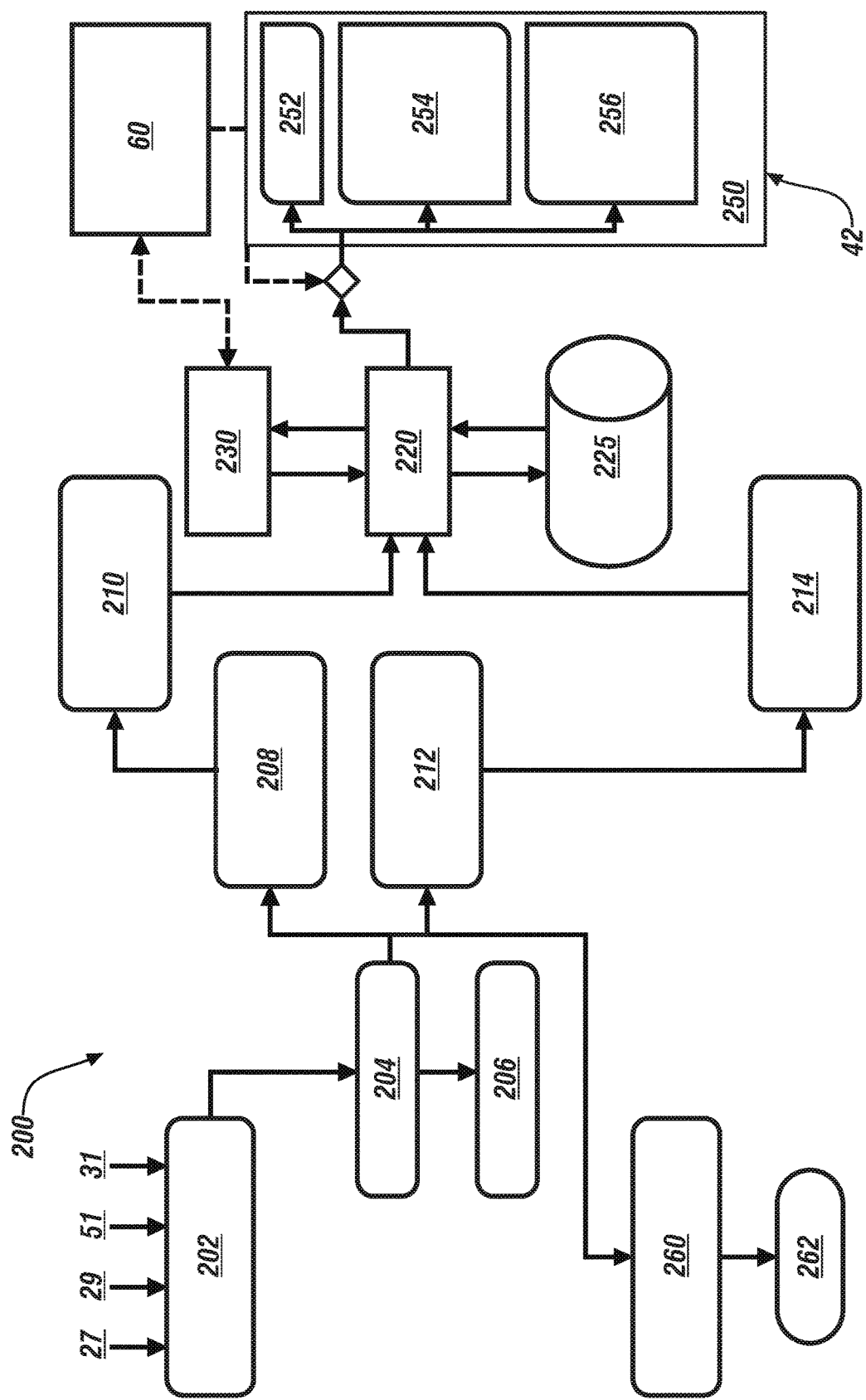
FIG. 2 schematically shows a braking system monitoring routine for monitoring a vehicle braking system, in accordance with the disclosure.

FIG. 2 schematically shows a braking system monitoring routine (routine) 200 for monitoring a vehicle braking system, an embodiment of which is described with reference to FIG. 1. The routine 200 can be reduced to practice as one or a plurality of controller-executable control routines. The routine 200 includes monitoring vehicle data (202), wherein such vehicle data includes monitoring the driver braking request 27, a brake actuation command 29 and vehicle operating parameters 31 during each braking event. The autonomic braking command 51 is also monitored on vehicle systems that include an embodiment of the driver assistance controller 50 that includes the autonomic brake control routine 52. A braking event is a vehicle operating event during which vehicle braking is applied, and is commanded by either or both the driver via the driver braking request 27 and the driver assistance controller 50 via the autonomic braking command 51. Examples of the driver braking request 27, brake actuation command 29, autonomic braking command 51 and vehicle operating parameters 31 are described with reference to FIG. 1.

Figure 3A:
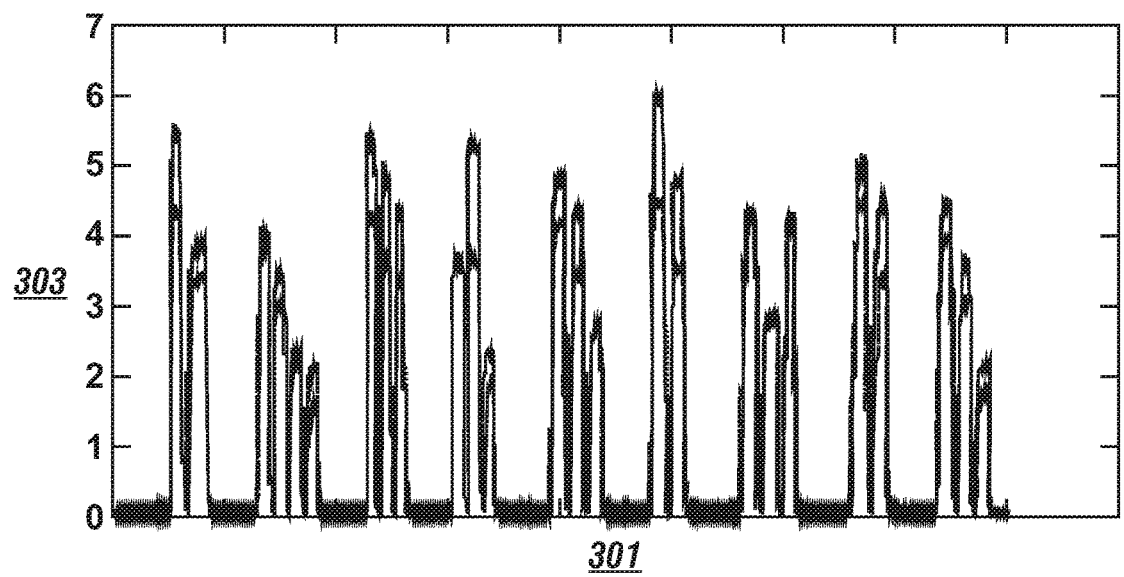
FIG. 3A graphically shows a plurality of braking request signals and corresponding brake actuation commands for the corner modules of front and rear wheels for an embodiment of the vehicle braking system described with reference to FIG. 1, in accordance with the disclosure.

The brake actuation command 29 includes brake-apply commands that are communicated to the brake actuators of the corner modules of the front and rear wheels 12, 14. Example data associated with a plurality of brake actuation commands 29 and associated braking pressures on the corner modules are shown with reference to FIG. 3A, wherein the brake actuation command and associated braking pressures are indicated on the vertical axis 303, and elapse time is indicated on the horizontal axis 301. The brake actuation command 29 can be in the form of hydraulic pressure commands when the braking system 20 is configured as a hydraulic or hydraulic-assisted braking system.

Figure 3B:
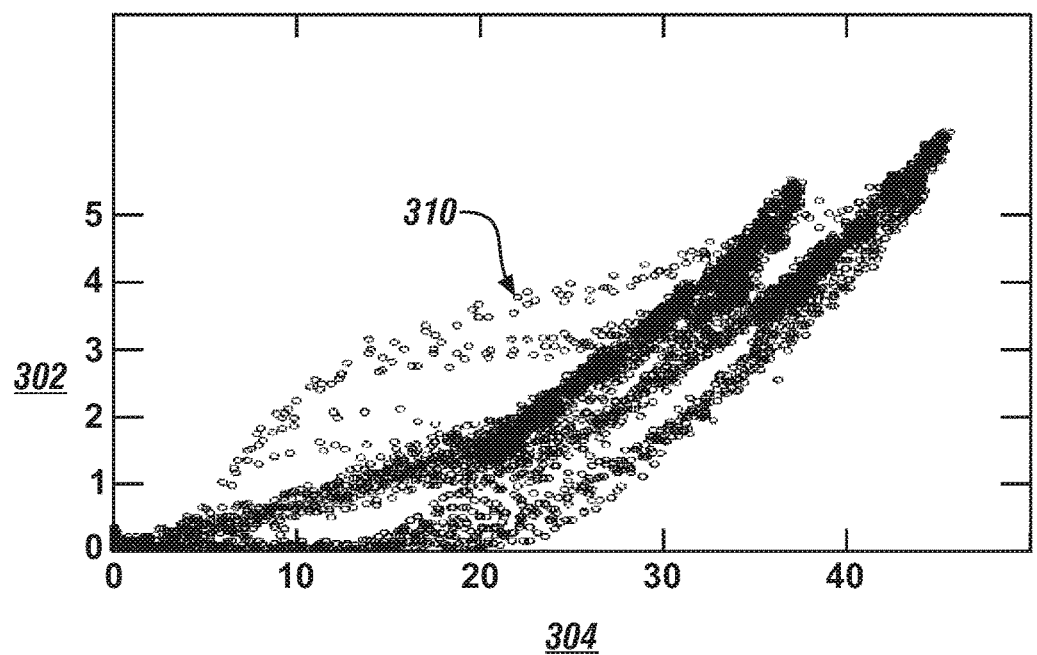
FIG. 3B graphically shows a plurality of brake actuation signals in relation to a corresponding plurality of braking request signals for an embodiment of the vehicle braking system described with reference to FIG. 1, in accordance with the disclosure.

Example data associated with a plurality of brake actuation commands 310 is shown with reference to FIG. 3B, wherein braking pressure (in units of MPa) is indicated on the vertical axis 302 and is shown in relation to the brake actuation command 29, which is shown as pedal position (%) on the horizontal axis 304. The pedal position (%) is one example of a suitable brake actuation command 29 in brake systems wherein the pedal position and fluid volume applied are closely coupled. When the brake system is an emulated brake system, e.g., an E-brake, an effective master cylinder displacement or pressure can be employed in place of the pedal position. The vehicle operating parameters 31 include input signals that are generated by the wheel speed sensors 32 of the corner modules of the front and rear wheels 12, 14. Other vehicle operating parameters 31 can be determined by monitoring signal outputs from the sensors described herein. The monitored vehicle data is subjected to signal characterization, which includes filtering (204) and data selection (206) of collected data that is associated with a braking event.

Figure 5:
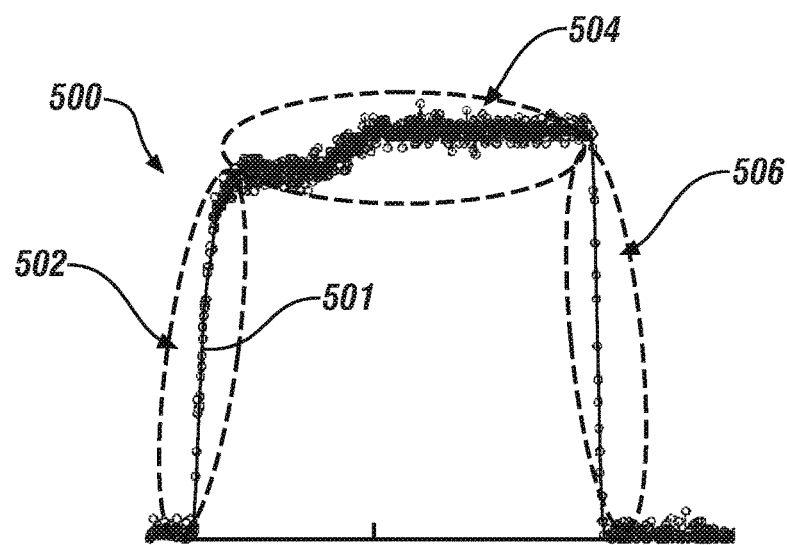
FIG. 5 graphically shows signals associated with a single braking event for an embodiment of the vehicle braking system described with reference to FIG. 1, including data associated with brake-apply, static braking and brake-release portions of the single braking event, in accordance with the disclosure.

Referring now to FIG. 5 with continued reference to FIG. 1, one example of a portion of collected data 500 that is associated with a single braking event is graphically shown, including a static portion of the data 500 and a dynamic portion of the data 500. The static portion of the data 500 is associated with static braking 504 portion of the single braking event. The dynamic portion of the data 500 is associated with brake-apply 502 and brake-release 506 portions of the single braking event. During each braking event, the collected data 500 includes data points 501 that are associated with the driver braking request 27 and/or autonomic braking command 51, the brake actuation command 29, and the vehicle operating parameters 31 during each of the brake-apply 502, static braking 504 and brake-release 506 portions.

Referring again to FIG. 2, with continued reference to FIG. 5, the steps of filtering (204) and data selection (206) include omitting data that was not associated with a braking event, and omitting data for another reason such as an incomplete or interrupted braking event. The step of filtering (204) further includes executing signal processing of the data associated with the braking event. In one embodiment, the filtering (204) includes extracting data during the static braking 504 of the single braking event, wherein the static braking 504 is identified based upon the driver braking request 27. In one embodiment, the static braking 504 is identified when the time-rate change in position of the brake pedal 26 is between −1%/s and +5%/s, the absolute values of the position of the brake pedal 26 is greater than 10%, and the vehicle speed is greater than 5 m/s.

The step of data selection (206) can include omitting a portion or all of the data associated with the braking event when the data is outside acceptable norms. The unused or omitted portions of the collected data 500 are identified (260) and discarded (262). The filtered and selected data output from steps (204) and (206) is reduced to determine data associated with brake-apply 502, static braking 504 and brake-release 506 portions of each braking event to single parameters for ease of storage and analysis. Representative data can be separated and generated for each selected brake event. The representative data includes data that is associated with static braking, i.e., static braking 504, and data that is associated with dynamic braking, i.e., brake-apply 502 and brake-release 506. The representative data is a compressed evaluation of the data associated with each brake event. Information compression allows smaller buffer and data transmission requirements. The vector indicator maintains the critical information for evaluation of health of the vehicle braking system 20. The representative data is separated into data that is associated with static braking, i.e., static braking 504 (208), and data that is associated with dynamic braking, i.e., brake-apply 502 and brake-release 506 (212). The data that is associated with static braking, i.e., static braking 504 (208) is input to a first data vector set for evaluation (210). Such evaluation includes determining elapsed braking time, minimum and maximum values for the driver braking request 27 and/or autonomic braking command 51, the brake actuation command 29, and the vehicle operating parameters 31 during each static braking 504 portion.

The data that is associated with dynamic braking, i.e., brake-apply 502 and brake-release 506 (212) are input to a second data vector set (214) for evaluation. Such evaluation includes determining elapsed braking time, wheel speed, pedal position and other values for the driver braking request 27 and/or the autonomic braking command 51, the brake actuation command 29, and the vehicle operating parameters 31 for each of the brake-apply 502 and the brake-release 506 portions.

The results associated with the evaluation of the first and second data vector sets (steps 210, 214) are evaluated by a vehicle health management routine (220). This includes capturing the results in a memory buffer (225) for future reference, and wirelessly communicating the results via telematics module (230) to the off-board communication system 60 for monitoring and analysis. The vehicle health management routine (220) evaluates the results to assess a state of health of the braking system 20. Either or both the vehicle health management routine and the off-board facility can visually, audibly and/or haptically communicate with the vehicle driver via the on-board driver communication system 42 to indicate a state of health of the braking system 20 (250). Such communication can include indicating that the state of health of the brake system 20 is acceptable (252), indicating that there is a need for maintenance of the brake system 20 (254), or indicating an imminent need to service the brake system 20 (256). When the braking system 20 is configured as a hydraulic or hydraulic-assisted braking system, assessing the state of health of the braking system can include monitoring the aforementioned parameters to evaluate and detect presence or absence of a leak in the fluidic circuit, and evaluate and detect presence or absence of incorporated air into the fluidic circuit.

Figure 4:
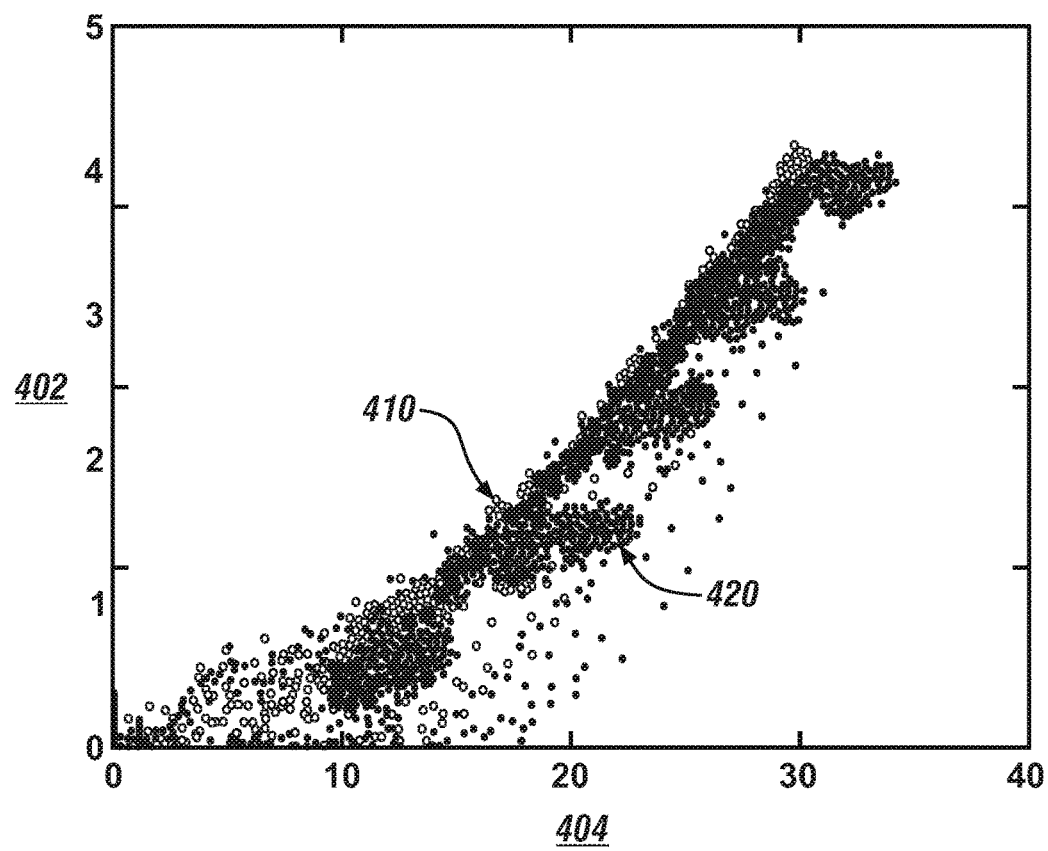
FIG. 4 graphically shows data associated with a plurality of brake actuation signals in relation to a corresponding plurality of braking request signals for an embodiment of the vehicle braking system described with reference to FIG. 1, including data associated with operation of the vehicle braking system when no fluidic leak or air incorporation is present and data associated with operation of the vehicle braking system when some level of fluidic leak or air incorporation is present, in accordance with the disclosure.

FIG. 4 graphically shows data associated with a plurality of brake actuation signals in relation to a corresponding plurality of braking request signals for an embodiment of the vehicle braking system 20 described with reference to FIG. 1, wherein braking pressure (in units of MPa) is indicated on the vertical axis 402 and is shown in relation to the brake actuation command 29, which is shown as pedal position (%) on the horizontal axis 404. The plotted results include a first dataset 410 that is associated with operation of the vehicle braking system 20 when no fluidic leak or air incorporation is present and a second dataset 420 that is associated with operation of the vehicle braking system 20 when some level of fluidic leak or air incorporation is present. The results indicate that there is some clustering of the data in the second dataset 420 that is associated with operation of the vehicle braking system 20 when some level of fluidic leak or air incorporation is present, thus allowing introduction of analytical techniques to separate the first dataset 410 from the second dataset 420.

Figure 6:
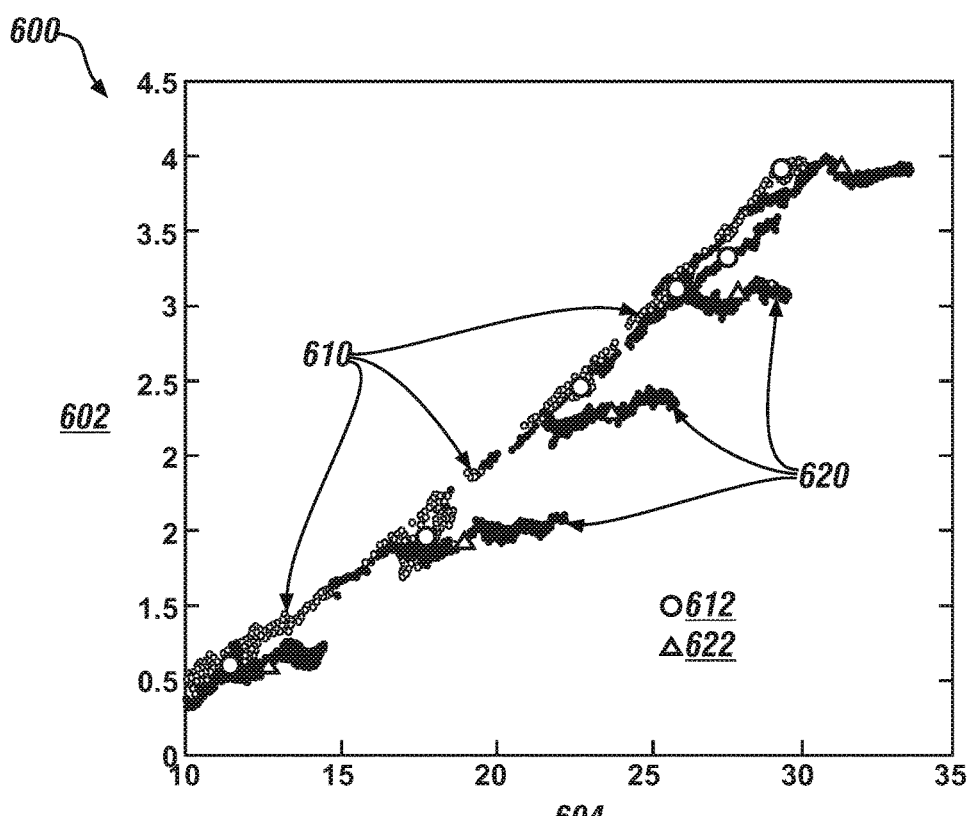
FIG. 6 graphically shows a plurality of brake actuation signals in relation to a corresponding plurality of braking request signals for an embodiment of the vehicle braking system described with reference to FIG. 1, including data and associated vectors that are associated with operation of the braking system when no fluidic leak or air incorporation is present and data and associated vectors that are associated with operation of the braking system when some level of fluidic leak or air incorporation is present, in accordance with the disclosure.

FIG. 6 graphically shows a plurality of brake actuation signals in relation to a corresponding plurality of braking request signals for an embodiment of the vehicle braking system 20 described with reference to FIG. 1, wherein braking pressure (in units of MPa) is indicated on the vertical axis 602 and is shown in relation to the brake actuation command, which is shown as pedal position (%) on the horizontal axis 604. The dataset includes data 610 and associated vectors 612 that are associated with operation of the braking system when no fluidic leak or air incorporation is present. The dataset also includes data 620 and associated vectors 622 that are associated with operation of the braking system when some level of fluidic leak or air incorporation is present.

Figure 7A:
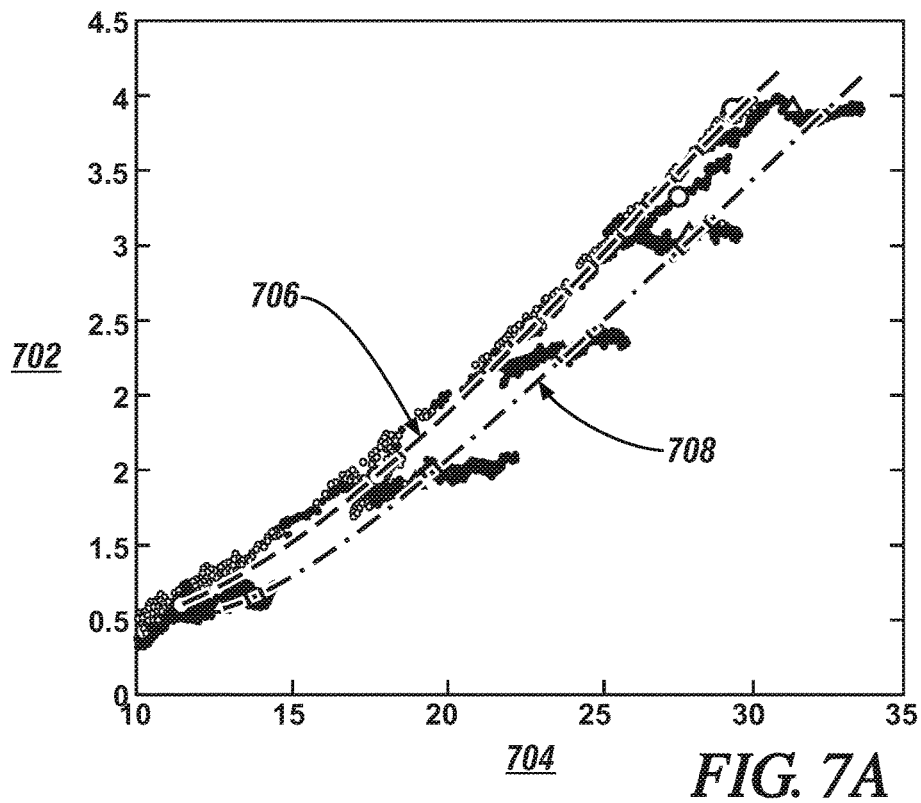
FIG. 7A graphically shows a plurality of brake actuation signals in relation to a corresponding plurality of braking request signals for an embodiment of the braking system and vehicle described with reference to FIG. 1, including static braking portions that are associated with operation of the vehicle braking system when no fluidic leak is present, and static braking portions that are associated with operation of the vehicle braking system when some level of fluidic leak is present, in accordance with the disclosure.

FIG. 7A graphically shows a plurality of brake actuation signals in relation to a corresponding plurality of braking request signals for an embodiment of the braking system 20 and vehicle 10 described with reference to FIG. 1, wherein braking pressure (in units of MPa) is indicated on the vertical axis 702 and is shown in relation to the brake actuation command, which is shown as pedal position (%) on the horizontal axis 704. The data includes results from the static braking portions for each braking event, wherein an example of a static braking portion of a braking event is shown as element 504 in FIG. 5. Line 706 indicates static braking portions of a plurality of braking events that are associated with operation of the vehicle braking system 20 when no fluidic leak is present. Line 708 indicates static braking portions of a plurality of braking events that are associated with operation of the vehicle braking system 20 when some level of fluidic leak is present. As such, the static braking portions of a plurality of braking events, in relation to an associated pedal position, can be employed to distinguish between operation of the vehicle braking system 20 when no fluidic leak is present and operation of the vehicle braking system 20 when a fluidic leak is present.

Figure 7B:
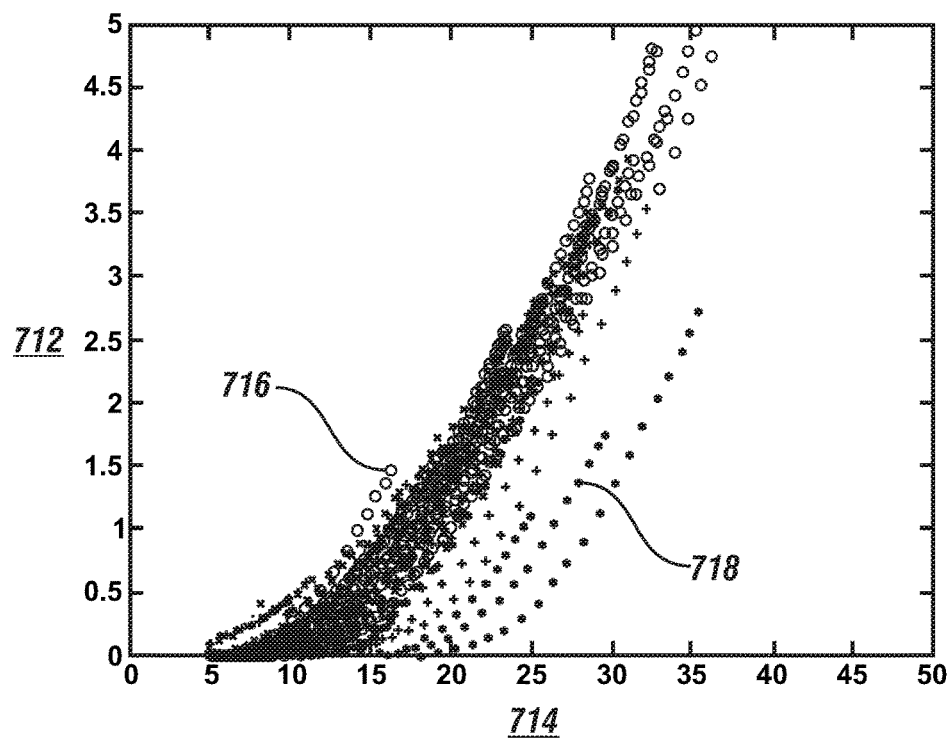
FIG. 7B graphically shows a plurality of brake actuation signals in relation to a corresponding plurality of braking request signals, including brake-release portions for an embodiment of the vehicle braking system described with reference to FIG. 1, including brake-release portions that are associated with operation of the vehicle braking system when no fluidic leak is present, and brake-release portions that are associated with operation of the vehicle braking system when some level of fluidic leak is present, in accordance with the disclosure.

FIG. 7B graphically shows a plurality of brake actuation signals in relation to a corresponding plurality of braking request signals for an embodiment of the braking system 20 and vehicle 10 described with reference to FIG. 1, wherein braking pressure (in units of MPa) is indicated on the vertical axis 712 and is shown in relation to the brake actuation command 29, which is shown as pedal position (%) on the horizontal axis 714. The data includes results from the brake-release portions for each braking event, wherein an example of a brake-release portion of a braking event is shown as element 506 in FIG. 5. The brake-release portions include brake-release portions that are associated with operation of the vehicle braking system 20 when no fluidic leak is present 716, and brake-release portions that are associated with operation of the vehicle braking system 20 when some level of fluidic leak is present 718. As such, the brake-release portions of a plurality of braking events, in relation to an associated pedal position, can be employed to distinguish between operation of the vehicle braking system 20 when no fluidic leak is present and operation of the vehicle braking system 20 when a fluidic leak is present.

Figure 8A:
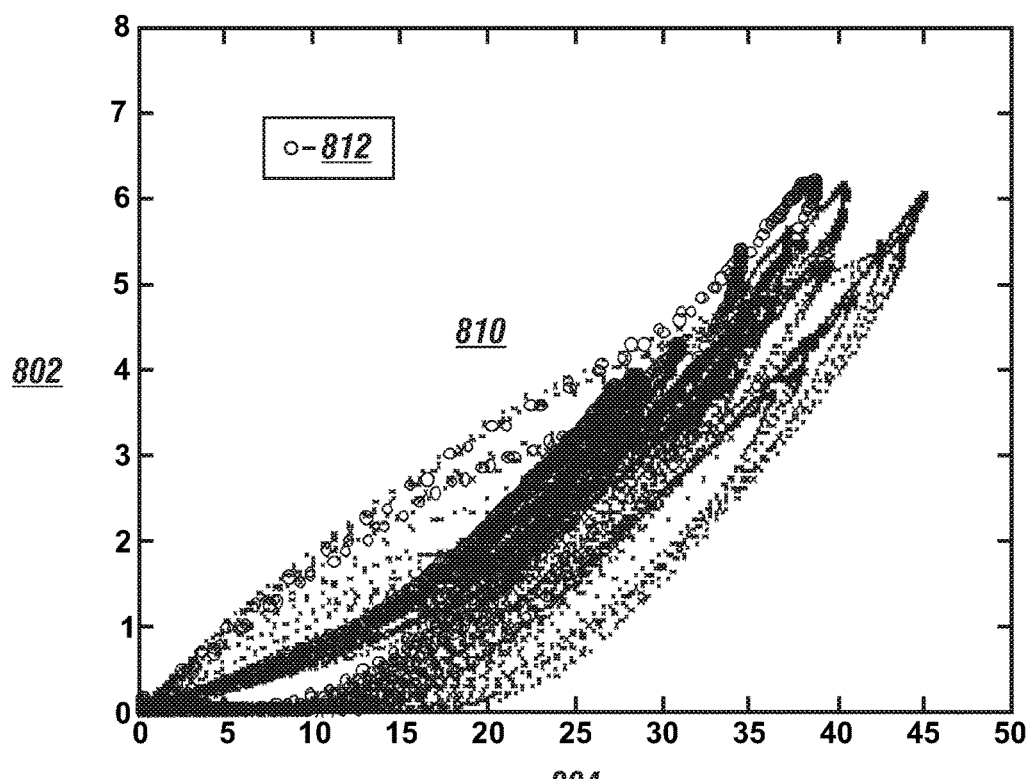
FIGS. 8A, 8B and 8C graphically show a plurality of brake actuation signals in relation to a corresponding plurality of braking request signals that are associated with operation of an embodiment of the vehicle braking system described with reference to FIG. 1 when no air incorporation is present and when some level of air incorporation is present, wherein FIG. 8A graphically shows data associated with complete brake actuation, FIG. 8B graphically shows brake-apply portions for the data shown with reference to FIG. 8A, and FIG. 8C graphically shows brake-release portions for the data shown with reference to FIG. 8A, in accordance with the disclosure.
Figure 8B:
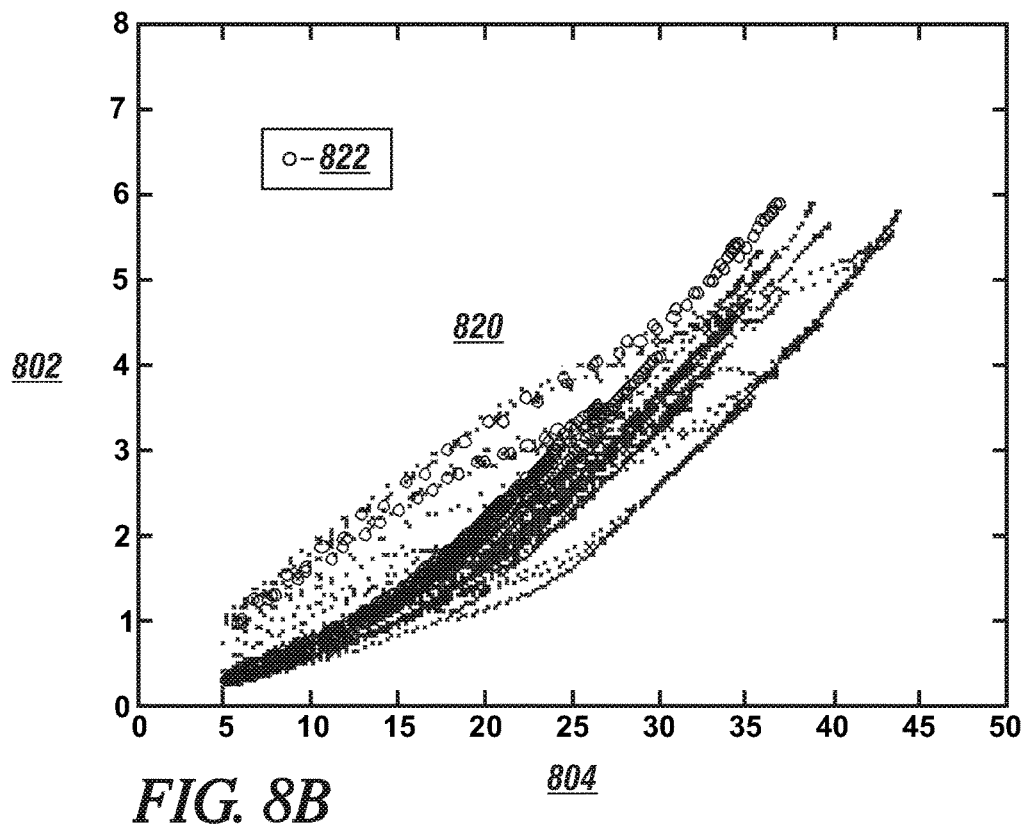
Figure 8C:
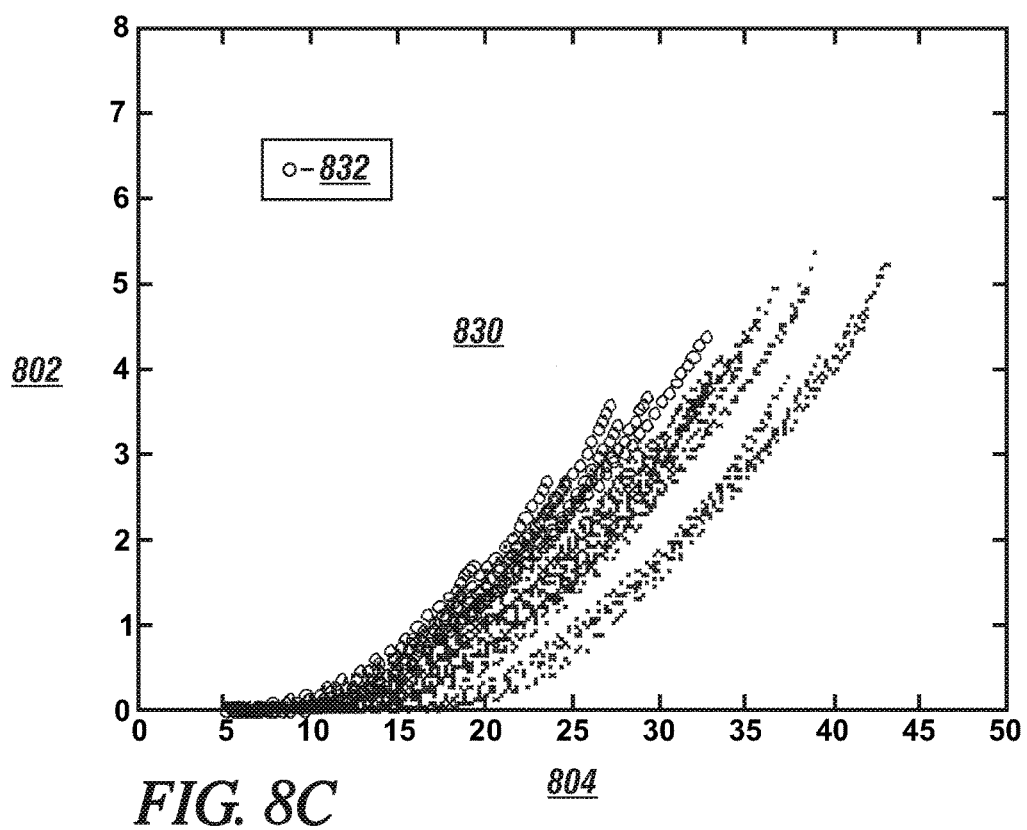

FIGS. 8A, 8B and 8C graphically show a plurality of brake actuation signals in relation to a corresponding plurality of braking request signals that are associated with operation of an embodiment of the vehicle braking system 20 described with reference to FIG. 1 wherein braking pressure (in units of MPa) is indicated on the vertical axis 802 and is shown in relation to the brake actuation command 29, which is shown as pedal position (%) on the horizontal axis 804. FIG. 8A shows a plurality of data points 810 when no air incorporation is present and when some level of air incorporation is present, including data associated with complete brake actuation events. A portion of the data points 810 identified by numeral 812 indicate those data points associated with no air incorporation. FIG. 8B graphically shows a portion of the data points 810 shown with reference to FIG. 8A, including the brake-apply portions 820 for the data shown with reference to FIG. 8A. A portion of the data points 820 identified by numeral 822 indicate those data points associated with no air incorporation. FIG. 8C graphically shows a portion of the data points 810 shown with reference to FIG. 8A, including the brake-release portions 830 for the data shown with reference to FIG. 8A. A portion of the data points 830 identified by numeral 832 indicate those data points associated with no air incorporation. The results indicate that the brake-release portions of a plurality of braking events, in relation to an associated pedal position, can be employed to distinguish between operation of the vehicle braking system 20 when no air incorporation is present and operation of the vehicle braking system 20 when air incorporation is present.

Figure 9:
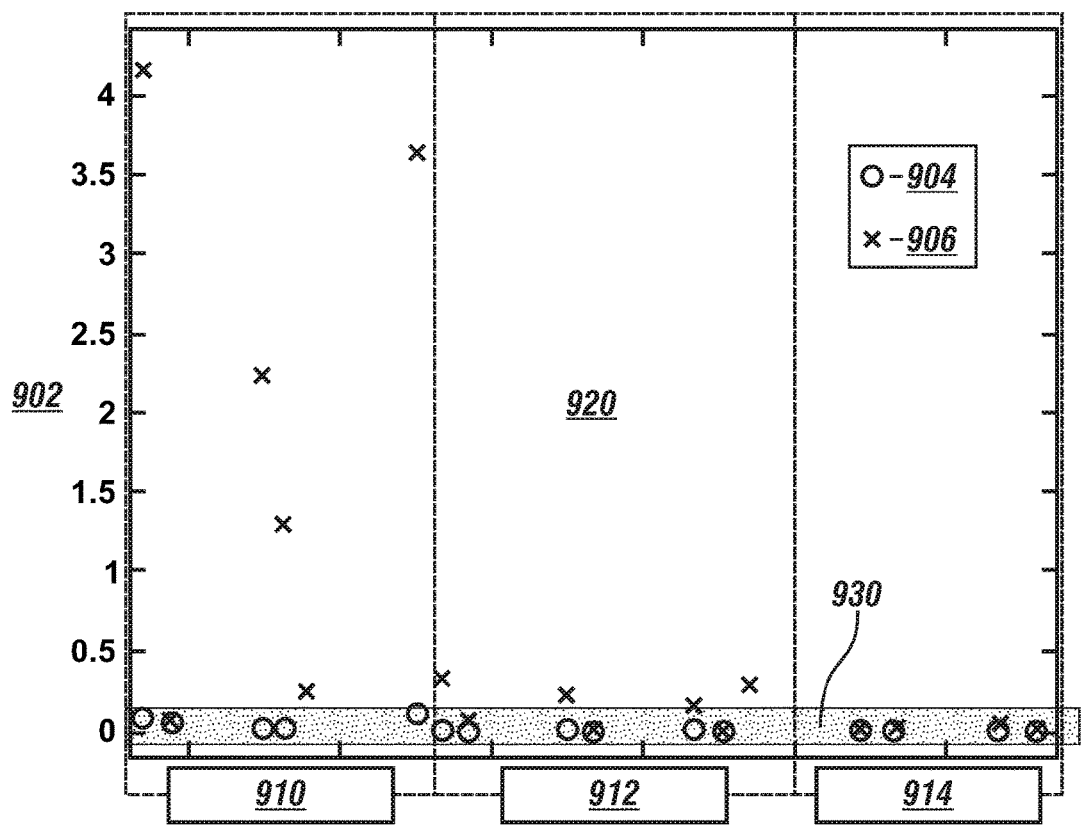
FIG. 9 graphically shows analysis of a plurality of brake actuation signals in relation to a corresponding plurality of braking request signals that are associated with operation of an embodiment of the vehicle braking system described with reference to FIG. 1, wherein the data shows variations in wheel deceleration differences in relation to rate of application of the braking requests that are associated with operation of the vehicle braking system when no air incorporation is present and when some level of air incorporation is present, in accordance with the disclosure.

FIG. 9 graphically shows analysis of a plurality of brake actuation signals that are associated with operation of an embodiment of the vehicle braking system 20 described with reference to FIG. 1, wherein variations in wheel deceleration differences ($m^2/s^4$) is indicated on the vertical axis 902 and is shown in relation to a plurality of braking request signals. The braking request signals are shown as a rate of pedal apply (%/s) on the horizontal axis, including a fast rate of pedal apply 910, a moderate rate of pedal apply 912 and a slow rate of pedal apply 914 are indicated. The data shows variations in wheel deceleration differences in relation to rate of application of the braking requests that are associated with operation of the vehicle braking system 20 when no air incorporation is present 904 and when some level of air incorporation is present 906. A first portion 930 and a second portion 920 are also indicated. As such, the wheel deceleration differences in relation to rate of application of the braking requests for a plurality of braking events can be employed to distinguish between operation of the vehicle braking system 20 when no fluidic leak is present and operation of the vehicle braking system 20 when a fluidic leak is present.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for monitoring a vehicle braking system, comprising:

monitoring, via an on-vehicle controller, a braking request, a brake actuation command and vehicle operation during each of a plurality of braking events;

determining parameters associated with the braking request, the brake actuation command and the vehicle operation during a single braking event of a plurality of braking events;

for each of the braking events:

segmenting the parameters associated with the braking request, the brake actuation command and the vehicle operation into parameters associated with a static portion of the single braking event and parameters associated with a dynamic portion of the single braking event, and evaluating the parameters associated with the static portion of the single braking event and evaluating the parameters associated with the dynamic portion of the single braking event;

assessing a state of health of the braking system based upon the evaluations of the parameters for the plurality of braking events; and communicating, via an on-board driver communication system, the assessment of the state of health of the braking system to a vehicle driver.

2. The method of claim 1, further comprising communicating the parameters associated with the static portion of the single braking event and the parameters associated with the dynamic portion of the single braking event to an off-board controller; wherein the off-board controller is disposed to evaluate the parameters, assess the state of health of the braking system based upon the evaluation, and communicate the assessment of the state of health of the braking system to the vehicle.

3. The method of claim 1, further comprising storing, in a memory device in communication with the on-vehicle controller, the parameters associated with the braking request, the brake actuation command and the vehicle operation during the static portion of the single braking event.

4. The method of claim 3, further comprising detecting occurrence of a fluidic leak in the vehicle braking system based upon the parameters associated with the braking request, the brake actuation command and the vehicle operation during the static portion of the single braking event.

5. The method of claim 1, further comprising storing, in a memory device in communication with the on-vehicle controller, the parameters associated with the braking request, the brake actuation command and the vehicle operation during the dynamic portion of the single braking event.

6. The method of claim 5, further comprising detecting presence of incorporated air in the vehicle braking system based upon the parameters associated with the braking request, the brake actuation command and the vehicle operation during the dynamic portion of the plurality of the braking events.

7. The method of claim 1, wherein monitoring the braking request comprises monitoring a driver braking request.

8. The method of claim 1, wherein monitoring the braking request comprises monitoring an autonomic braking command.

9. The method of claim 1, wherein the braking request is initiated by application of a brake pedal, and wherein the static portion of the braking request comprises that portion when a time-rate change in position of the brake pedal is between −1% and +5%.

10. The method of claim 9, wherein the static portion of the braking request further comprises that portion when an absolute position of the brake pedal is greater than 10%.

11. A vehicle braking system, comprising:

a brake pedal in communication with a wheel brake;

a brake actuation system;

a braking system controller;

an on-board driver communication system; and a controller operatively connected to the braking system controller and in communication with the brake pedal and the brake actuation system, the controller including an instruction set, the instruction set executable to:

monitor the brake pedal to determine a braking request, monitor the brake actuation system to determine a brake actuation command, monitor vehicle operation;

determine parameters associated with the braking request, the brake actuation command and the vehicle operation during a single braking event of a plurality of braking events;

segment the parameters associated with the braking request, the brake actuation command and the vehicle operation into parameters associated with a static portion of the single braking event and parameters associated with a dynamic portion of the single braking event;

evaluate the parameters associated with the static portion of the single braking event and evaluate the parameters associated with the dynamic portion of the single braking event;

assess a state of health of the braking system based upon the evaluations of the parameters for the plurality of braking events; and communicate, via the on-board driver communication system, the assessment of the state of health of the braking system to a vehicle driver.

12. The vehicle braking system of claim 11, further comprising the instruction set executable to communicate the parameters associated with the static portion of the single braking event and the parameters associated with the dynamic portion of the single braking event to an off-board controller; wherein the off-board controller is disposed to evaluate the parameters, assess the state of health of the braking system based upon the evaluation, and communicate the assessment of the state of health of the braking system to the vehicle.

13. The vehicle braking system of claim 11, further comprising the instruction set executable to store, in a memory device in communication with the on-vehicle controller, the parameters associated with the braking request, the brake actuation command and the vehicle operation during the static portion of the single braking event during each of the plurality of braking events.

14. The vehicle braking system of claim 13, further comprising the instruction set executable to detect occurrence of a fluidic leak in the vehicle braking system based upon the parameters associated with the braking request, the brake actuation command and the vehicle operation during the static portion of the plurality of the braking events.

15. The vehicle braking system of claim 11, further comprising the instruction set executable to store, in a memory device in communication with the on-vehicle controller, the parameters associated with the braking request, the brake actuation command and the vehicle operation during the dynamic portion of the single braking event during each of the braking events.

16. The vehicle braking system of claim 15, further comprising the instruction set executable to detect presence of incorporated air in the vehicle braking system based upon the parameters associated with the braking request, the brake actuation command and the vehicle operation during the dynamic portion of the plurality of the braking events.

17. The vehicle braking system of claim 11, wherein the instruction set executable to monitor the braking request comprises the instruction set executable to monitor a driver braking request.

18. The vehicle braking system of claim 11, wherein the instruction set executable to monitor the braking request comprises the instruction set executable to monitor autonomic braking command.

19. The vehicle braking system of claim 11, wherein the braking request is initiated by application of the brake pedal, and wherein the static portion of the braking request comprises that portion when a time-rate change in position of the brake pedal is between −1% and +5%.

20. The vehicle braking system of claim 19, wherein the static portion of the braking request further comprises that portion when an absolute position of the brake pedal is greater than 10%.

\* \* \* \* \*